United States Patent [19]

Porter

[11] Patent Number: 4,939,845
[45] Date of Patent: Jul. 10, 1990

[54] MULTI PURPOSE THREAD RING GAGE

[75] Inventor: Robert D. Porter, Florissant, Mo.

[73] Assignee: McDonnell Douglas Corporation, Long Beach, Calif.

[21] Appl. No.: 394,959

[22] Filed: Aug. 17, 1989

[51] Int. Cl.⁵ .............................................. G01B 3/48
[52] U.S. Cl. ................................... 33/199 R; 33/555.2
[58] Field of Search ................... 33/199 R, 550, 552, 33/554, 556, 557, 178 R, 530, 543, 829, 555.1, 555.2

[56] References Cited

U.S. PATENT DOCUMENTS

| | | | |
|---|---|---|---|
| 2,594,143 | 4/1952 | Fichter | 33/199 R |
| 2,634,508 | 4/1953 | Stainton | 33/199 R |
| 2,793,443 | 5/1957 | Wedin | 33/199 R |
| 3,111,766 | 11/1963 | Bryant | 33/199 R |
| 4,590,678 | 5/1986 | Arredondo | 33/199 R |

Primary Examiner—William A. Cuchlinski, Jr.
Assistant Examiner—Daniel G. DePumpo
Attorney, Agent, or Firm—Ben J. Yorks; George W. Finch; John P. Scholl

[57] ABSTRACT

The present invention is directed to an improved, multi purpose measuring device for determining various parameters of an externally threaded member. In particular, the invention includes a substantially ring shaped housing slidably supporting at least one pair of gage plugs having measuring assemblies mounted thereon. As the gage plugs are selectively moved through the housing to bring the measuring assemblies into contact with an externally threaded member for determining various parameters such as the actual and functional pitch diameters, the minor diameter and the concentricity of the threaded member.

15 Claims, 2 Drawing Sheets

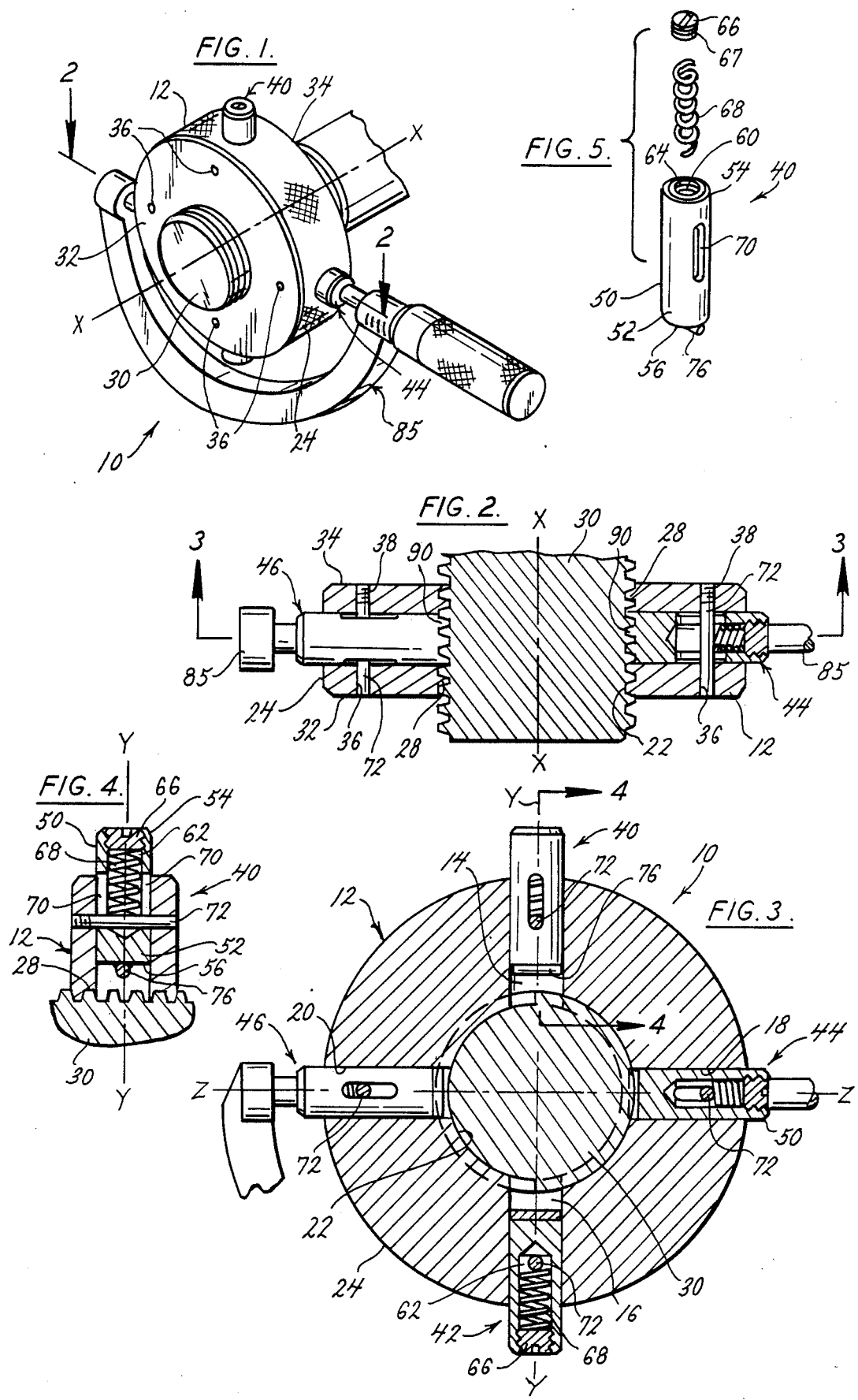

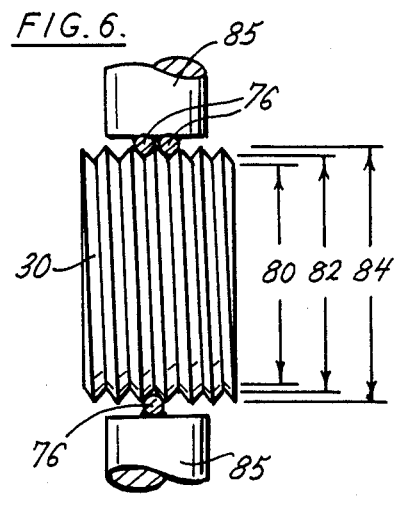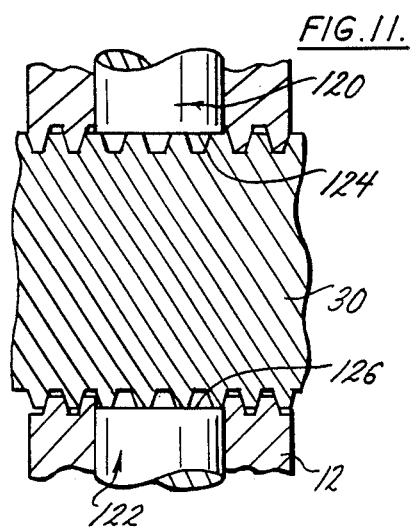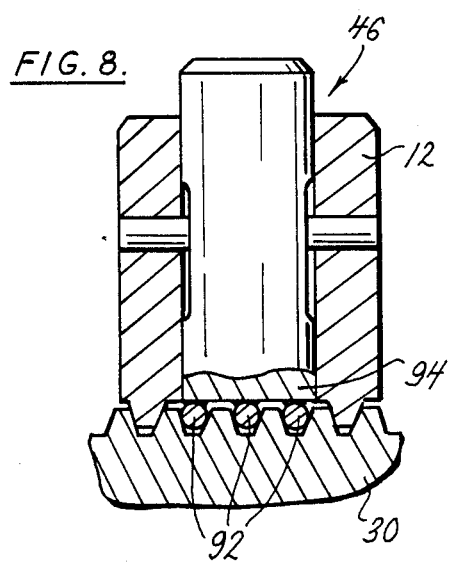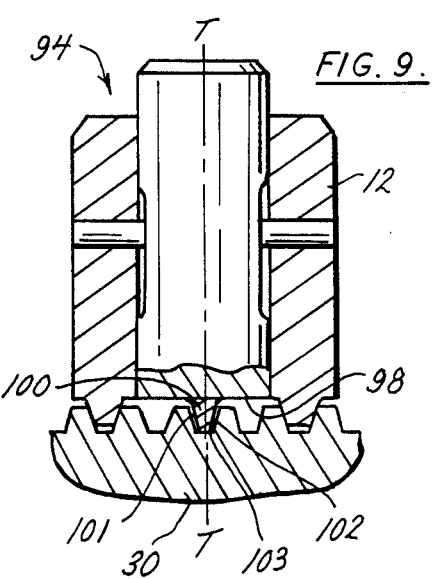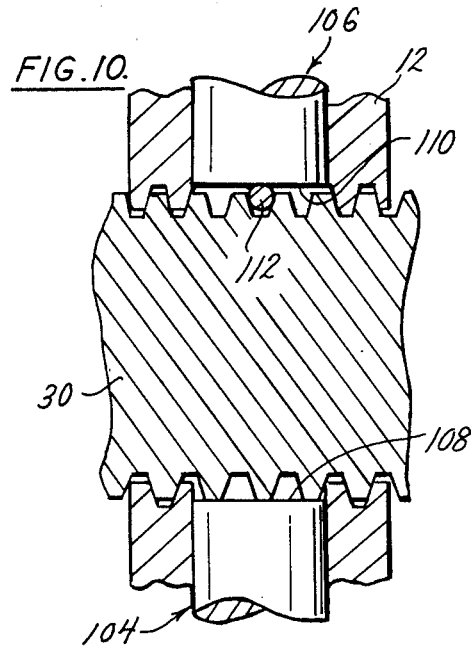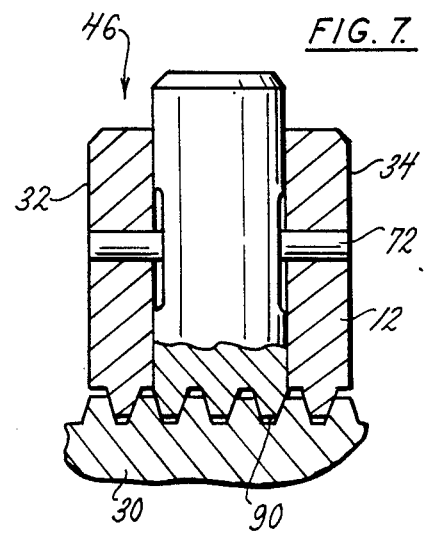

MULTI PURPOSE THREAD RING GAGE

BACKGROUND OF THE INVENTION

1. Field of the Invention

The present invention generally relates to hand-held measuring devices and, more particularly, to a new and improved multi-purpose measuring device adaptable for easily determining the major, minor and pitch diameters of a screw thread, the concentricity of the thread as well as whether the lead and flank angles of the thread are within acceptable limits. In addition, the present invention functions as a "GO" gage to indicate whether a screw thread will functionally assemble with its threaded mating part.

2. Description of the Prior Art

A multiplicity of separate gaging devices are currently required to adequately measure various parameters such as the actual pitch diameter, the functional pitch diameter, the concentricity, the minor diameter and the maximum diameter of an externally threaded screw member. For example, while U.S. Pat. No. 2,793,443 issued May 28, 1957 suggests a standard thread ring or "GO" gage, this device can not provide the pitch diameter, the concentricity nor even the minor diameter of the thread. In comparison, while the device suggested in U.S. Pat. No. 3,111,766 issued Nov. 26, 1963 can arguably be used to determine the pitch diameter, it can not provide the concentricity, the minor diameter nor a "GO" ring determination of the maximum thread size allowable for its mating part. Likewise, while the device suggested in U.S. Pat. No. 4,590,678 issued May 27, 1986 could arguably provide the concentricity of a screw thread if properly employed, it is believed that this device can not provide the functional pitch diameter necessary for determining allowable lead and flank angles as well as the minor diameter of the threaded screw.

In the aircraft industry it has become increasingly important to provide externally threaded screw members capable of meeting the stringent tolerances required for use in safety critical applications. Such threaded screw members are often inspected by relatively unskilled personnel, making it essential that any thread gage measuring devices be as easy to use as possible, while still providing the degree of accuracy necessary to meet required structural tolerances. Because the required gage measurements are often performed in less than ideal locations, such as adjacent to, or even on the thread cutting machinery, the ideal measuring device should be as compact as possible and preferably free from the need for any support holder or the like. For example, when currently determining the actual pitch diameter of a threaded work product, a plurality of three separate gaging wires are normally positioned on opposite sides of the newly cut screw thread. The gaging wires are hand held in place while a micrometer is simultaneously applied over the wires. It is evident that this procedure can easily lead to a user dropping and even losing one or more of the wires during the measuring operation. Alternatively, the three gaging wires may be retained against the screw thread by a support assembly or holder, possibly of a type suggested in U.S. Pat. No. 2,692,438 issued Oct. 26, 1954. In either case, the measurement procedure tends to be awkward at best and can easily lead to inaccurate measurement of the critical design parameters of the screw thread.

In an effort to overcome the present need for a wire holding device as well as a plurality of separate, often cumbersome devices for measuring the various parameters of a screw thread or the like, the present invention provides a unique gage plug assembly capable of permanently retaining gaging wires in their proper positions, without the need for any support or mechanical contrivance as required in the U.S. Pat. No. 2,692,438. Additionally, the present invention can provide such measurements as the functional pitch diameter, concentricity, major and even minor diameters of the screw thread. As a result, the present invention provides a thread gage measuring device uniquely capable of providing many of the necessary measurements required for assuring compliance with existing DoD and FAA directives for construction of aircraft safety critical threaded components. It should be understood that the present invention is in no way limited to use in the aircraft industry. Rather, the multi-purpose measuring device making up the present invention is adaptable for providing precision measurements of externally threaded screws, gears, splines and the like intended for use in almost any industry.

OBJECTS AND SUMMARY OF THE PRESENT INVENTION

An object of the present invention is to provide a hand-held measuring device capable of replacing the plurality of separate measuring devices currently needed for determining the actual pitch diameter, the functional pitch diameter as well as the major diameter of screw threads, gears, splines and the like.

A further object of the present invention is to provide a measuring device having interchangeable gaging plugs adaptable for determining additional parameters of a screw thread such as the concentricity and minor diameter.

A yet further object of the present invention is to provide a hand held measuring device employing slidable gaging plugs normally biased into retracted positions, wherein the device functions as a "GO" thread ring gage by determining whether the externally threaded screw has a maximum diameter compatible with its threaded mating component.

A preferred embodiment of the present invention achieves the aforesaid objects by providing a multi-purpose, hand held measuring device including interchangeable pairs of gaging plugs. The plugs are slidably retained in passageways formed in a ring gage housing and normally biased in radially outwardly directions. This assures that the plugs will not interfere with insertion of a screw thread through a central opening in the housing. Preferably, a first pair of gaging plugs are positioned on opposite sides of the housing and independently slide in radial directions along a common axis extending transversely through the housing. Similarly, a second pair of gaging plugs are also positioned on opposite sides of the housing and are also disposed to slide in a radial direction along a different common axis also extending transversely through the housing. The two transversely extending axes extend substantially perpendicular to one another, resulting in adjacently disposed gaging plugs being circumferentially spaced substantially 90 degrees from one another. The circumferential spacing between adjacent plugs need only be large enough to avoid interference and still provide an accurate measurement of the various parameters of the screw thread in a manner which will become clear hereafter.

In the preferred embodiment, the first pair of gaging plugs include confronting inner ends each having a single gaging wire permanently attached to confronting end surfaces. The two gaging wires extend substantially parallel to one another and generally perpendicular to the longitudinal axis of the ring gage housing. The second pair of gaging plugs also include threaded end surfaces each having a generally sawtooth configuration. The two sets of teeth extend toward one another and form a mating profile of a screw thread to be measured. Each of the gaging plugs includes an elongated cavity containing a helical spring adaptable for moving the slidable plug in a radially outwardly direction relative to a fixed support pin mounted in the housing and extending through each plug. The springs serve to bias the plugs away from one another and into their normally retracted positions. As a result, the gaging plugs will not interfere with the selective insertion of a screw thread through the central opening in the ring gage housing. The wall forming the central opening is designed with a threaded surface having a predetermined diameter just sufficient to allow insertion of a screw thread not exceeding the maximum allowable diameter.

During operation, a screw, gear or the like having an external thread to be measured is threaded into the central opening in the ring gage housing. By inserting the screw thread through the central opening in the housing, it is immediately evident that the maximum diameter of the screw thread is not excessive. This assures the user that the screw thread will functionally assemble with its threaded mating component. In effect, the central opening in the housing functions as a "GO" ring gage.

Once the screw extends longitudinally through the housing, a device such as a micrometer may be positioned adjacent the outer end surfaces of the first pair of oppositely disposed gaging plugs. By appropriate manipulation of the micrometer, the first pair of gaging plugs are forced to slide through their respective passageways in radially inwardly directions toward one another. Eventually, the single gaging wire mounted on each plug comes to rest tangentially against adjacent flank surfaces of the screw thread to be measured. Even though only a single gaging wire is attached to each gaging plug, the present invention can be used to determine the actual pitch diameter of the screw thread by merely subtracting a predetermined constant from the micrometer reading. Alternatively, it is considered within the scope of the present invention to employ three separate gaging wires for determining the actual pitch diameter as demonstrated in applicant's U.S. Pat. No. 4,821,422 issued Apr. 18, 1989 and incorporated by express reference thereto.

In order to determine whether the angles of the screw thread are within allowable limits, it is merely necessary to position the micrometer against the radially outwardly extending second pair of gaging plugs. The micrometer is manipulated to move the gaging plugs radially inwardly until the threaded inner end portions of the gaging plugs come to rest against the external surface of the screw thread. The observed reading on the micrometer (after subtraction of a predetermined constant) indicates the functional pitch diameter of the screw thread. The value of the functional pitch diameter can be compared with the actual pitch diameter and, if the difference is within a predetermined range, the lead and flank angles of the screw thread are considered acceptable. While a micrometer is indicated as the measuring element, it makes up no part of the present invention and any suitable measuring device could be substituted therefore. Likewise, while it has been suggested that the second pair of gaging plugs be formed with confronting surfaces of threaded, sawtooth configuration, it would be within the scope of the present invention to permanently attach a plurality of two or more gaging wires to the inner end surface of each gaging plug for determining the functional pitch diameter.

Because the slidable gaging plugs are interchangeable, the first and second pairs of plugs may be removed and replaced with third and fourth pairs of plugs as required. Preferably, two or more color coded ring gage housings can be employed, including a first housing receiving the first and second pairs of gaging plugs; with a second, identically constructed ring gage housing receiving third and fourth pairs of similarly constructed slidable gaging plugs. The slidable gaging plugs forming the third pair are oppositely disposed from one another as are the slidable gaging plugs forming the fourth pair. Preferably, the third pair of gaging plugs are aligned with a common transverse axis extending through the housing. In a similar manner, the fourth pair of gaging plugs are aligned with a different common transverse axis which extends through the housing in a direction that is perpendicular to the common axis of the third pair of gaging plugs. This results in each of the four plugs being circumferentially spaced substantially 90 degrees from adjacently disposed plugs. The third pair of gaging plugs include confronting inner end surfaces each formed with a "V" shaped protrusion. The inclined angle of the side walls of each protrusion form an angle which is less than the inclined angle of the thread form being measured. For example, if the screw thread has an included angle of 60 degrees, then a protrusion having an included angle of substantially 55 degrees from the common transverse axis aligned with the third pair of gaging plugs would be acceptable. A conventional micrometer or similar measuring device is positioned adjacent the outer ends of the third pair of gaging plugs and manipulated to move the plugs radially inwardly toward one another until the "V" shaped end portions are seated against a groove formed by the screw thread. The micrometer reading then observed, after subtraction of a predetermined value, will reflect the actual minor diameter of the screw thread.

The fourth pair of gaging plugs may include a slidable plug having a single gaging wire permanently attached to its inner end surface, and a separate, slidable plug having a smooth inner end surface confronting and spaced from the single gaging wire. The gaging wire is arranged to extend substantially perpendicular to the longitudinal axis of the housing. During operation, the oppositely disposed fourth pair of gaging plugs are moved radially inwardly by a micrometer until making contact with the screw thread. The housing and inwardly extending plugs are then systematically rotated about the screw thread. Variations in the micrometer reading directly indicate the change in concentricity of the pitch cylinder when compared to the outside diameter of the screw thread.

While four separate pairs of slidable gaging plugs are preferably contemplated for use with two separate ring gage housings, the number of pairs of gaging plugs employed with any ring gage housing may vary. For example, if sufficient room exists, a single housing could conceivably include two, three or all four pairs of gaging plugs (eight separate plugs) Alternatively, each pair of slidable gaging plugs could be mounted in a separate ring gage housing and sequentially employed to measure a screw thread and the like. Likewise, the ring gage housing need not be made with the cylindrical donut shape usually associated with a conventional thread ring gage. For example, the housing could be formed with a rectangular configuration, provided the central opening be of a shape compatible with a screw thread to be inserted therethrough.

A more complete understanding of the invention can be obtained from the following detailed description when read in conjunction with the accompanying drawings wherein similar elements are referred to and indicated by similar reference numerals.

BRIEF DESCRIPTION OF THE DRAWINGS

The present invention will now be described in more detail in the following portions of this specification with reference to the accompanying drawings, wherein:

FIG. 1 is a perspective view of a preferred embodiment of the present invention;

FIG. 2 is a sectional view taken along the lines 2—2 of FIG. 1;

FIG. 3 is a cross-sectional view of the preferred embodiment taken along the lines 3—3 of FIG. 2;

FIG. 4 is a partial sectional view taken along the lines 4—4 of FIG. 3;

FIG. 5 is an exploded view of a gaging plug employed in the embodiment of FIG. 1;

FIG. 6 is enlarged sectional view of a typical three wire measuring assembly;

FIG. 7 is a sectional view of a slidable gaging plug adaptable for determining the functional pitch diameter of a screw thread;

FIG. 8 is a sectional view through an alternate slidable gaging plug adaptable for determining the functional pitch diameter of a screw thread;

FIG. 9 is a sectional view through a slidable gaging plug adaptable for determining the minimum diameter of a screw thread; and FIG. 10 is a partial sectional view through a pair of slidable gaging plugs adaptable for determining the concentricity of a screw thread.

FIG. 11 is a partial sectional view through a pair of slidable gaging plugs adaptable for determining the major diameter of a screw thread.

DETAILED DESCRIPTION OF THE PREFERRED EMBODIMENT

The preferred embodiment of the present invention is illustrated by way of example in FIGS. 1–5. With specific reference to FIGS. 1 and 3, a hand held measuring device is generally indicated at 10. The device includes a substantially ring shaped housing 12, having a plurality of separate cylindrical wall surfaces forming four separate cylindrical passageways 14, 16, 18 and 20. Each passageway extends in a radially outwardly direction from the longitudinal axis X—X of housing 12. In addition, housing 12 includes an interior end surface 22 forming a cylindrical passageway completely through housing 12 centered on longitudinal axis X—X. Finally, housing 12 includes a cylindrically shaped exterior end surface 24 which optionally may be knurled for ease of use.

Cylindrical passageways 14 and 16 are preferably disposed on opposite sides of housing 12 from one another and are aligned with a common transverse axis Y—Y passing through housing 12. In a similar manner, cylindrical passageways 18 and 20 are also disposed on opposite sides of housing 12 and are aligned with a further transverse axis Z—Z passing through housing 12. As apparent from FIG. 3, axes Y—Y and Z—Z extend substantially perpendicular to one another, resulting in each of the cylindrical passageways 14–20 being angularly disposed substantially 90 degrees from one another. In addition, each of the passageways 14–20 extends the entire distance from interior end surface 22 to exterior end surface 24 of housing 12. The reason for this particular construction will become apparent from the specification.

As shown in FIGS. 2 and 4, the interior end surface 22 of housing 12 is shaped as a continuous thread 28 having a maximum diameter no greater than the maximum diameter of a screw thread 30, to be measured. Housing 12 is of cylindrical configuration, and includes opposite sides 32 and 34 extending parallel to one another between cylindrically shaped inner and outer surfaces 22 and 24, respectively. While a cylindrically shaped housing is preferred for ease of construction and use, it is considered within the scope of the present invention to employ a housing of almost any shape, provided only that interior end surface 22 be threadable onto the screw thread 30 to be measured and any slidable gaging plugs do not interfere with one another during operation. For example, housing 12 could be rectangularly shaped, provided the inner end surface form an opening capable of threading onto the exterior surface of screw thread 30.

Referring now to FIGS. 1 and 2, a plurality of four separate, yet identically shaped apertures 36 extend completely through housing 12 between sides 32 and 34. Each aperture 36 is aligned with and intersects one of the cylindrical openings 14–20. Preferably, at least a portion of each aperture 36 is formed with a continuously threaded interior surface portion 38. This provides for threaded engagement with a threaded locking member in a manner to be explained. As shown in FIG. 2, each of the apertures 36 extends substantially parallel to the longitudinal X—X passing through housing 12.

Turning to FIG. 3, a plurality of separate gaging plug assemblies 40, 42, 44 and 46 are slidably disposed in the cylindrical openings 14–20, respectively. In particular, a first pair of gaging plug assemblies 40 and 42 are disposed in passageways 14 and 16 respectively, and constrained to slide radially through housing 12 along the Y—Y transverse axis. In a similar manner, a second pair of gaging plug assemblies 44 and 46 are disposed in passageways 18 and 20 respectively, and constrained to slide radially through housing 12 along the Z—Z transverse axis. As shown in FIGS. 1 and 3, each of the gaging plug assemblies 40–46 extends beyond the cylindrical exterior end surface 24 of housing 12.

A typical gaging plug assembly 40 is shown in detail in FIGS. 4 and 5 to include a cylindrical body 50 having an inner end portion 52 and an oppositely disposed outer end portion 54. Inner end portion 52 further includes a circular inner end surface 56, while outer end portion 54 includes a circular end surface having a bore wall 60 extending perpendicularly therethrough. Bore wall 60 is of cylindrical configuration and extends partially through cylindrical member 50 along transverse axis Y—Y of housing 12, ending at a position spaced from inner end surface 56. Bore wall 60 forms a blind bore 62 within cylindrical body 50. A portion bore of wall 60 located near outer end portion 54 is formed with a continuously threaded portion 64. A separate cap member 66 includes an externally threaded portion 67 adaptable for engaging the threaded portion 64 of bore wall 60 as cap 66 is screwed into cylindrical body 50. A resilient biasing member, preferably in the form of a helical spring 68 is insertable into the blind bore 62 in gaging plug assembly 40. While a helical spring is selected for ease of use in the preferred embodiment, it is considered within the scope of the present invention to employ any type of biasing means such as the use of elastomeric material in place of spring 68.

A pair of elongated, parallel slots 70 are formed in opposite sides of cylindrical body 50 and intersect with blind bore 62. Parallel slots 70 extend generally toward, but do not reach the end portions 52 and 54 of cylindrical body 50. The exact size and location of the slots 70 is considered a design choice, it merely being necessary that gaging plug assemblies 40–46 be retractable in radially outwardly directions a sufficient distance to allow screw thread 30 to be inserted into the central opening formed by inner wall 22 of housing 12. Finally, gaging plug assembly 40 includes a threaded locking member 72 having an outer diameter slightly smaller than the diameter of aperture 36 and a length sufficient to extend through housing 12, slots 70 and blind bore 62.

During assembly of gaging plug assembly 40 within housing 12, cylindrical body 50 is positioned within radially extending passageway 14. Locking member 72 is inserted through aperture 36, slots 70 and bore 62 to retain cylinder 50 within passageway 14. Helical spring 68 is then inserted into bore 62 until it comes to rest against locking member 72. Finally, cap 66 is inserted into the threaded end 64 of bore wall 60, compressing helical spring 68 against locking member 72. While locking member 72 is described as being threaded, it is considered within the scope of the present invention to substitute any conventional attachment member for the member 72. For example, a roll pin could be inserted into aperture 36 and retained in position only by friction. It is noted that a conventional sealant such as quick drying cement may be added to the threaded portion 67 of cap 66 to permanently join cap 66 to cylindrical body 50. Because locking member 72 is constrained by aperture 36 from moving relative to housing 12, helical spring 68 serves to bias gaging plug assembly 40 in a radially outwardly direction through passageway 14 until the inner ends of slots 70 contact locking member 72, preventing further movement. This is the normal rest position of gaging plug assembly 40, corresponding to the fully retracted condition wherein the inner end surface 56 of cylindrical body 50 is spaced a maximum distance from the longitudinal axis X—X of housing 12 as well as any screw thread 30 inserted therein. Because each of the plug assemblies 42, 44 and 46 is constructed in an identical manner to plug assembly 40, a detailed explanation of the remaining plug assemblies has been omitted for purposes of convenience. It should be noted that while the gaging plug assemblies 40–46 are similar in construction, the inner end surfaces 56 of each pair of plugs are uniquely formed to provide measurement of a particular parameter of a screw thread 30. In order to best describe the differences in the pairs of plugs, each pair of plugs will be described in terms of the particular measurement they provide.

Turning now to FIG. 6 for a brief discussion of the parameters measurable by the present invention, a typical screw thread 30 is shown with three identically shaped, conventional gaging wires 76 positioned on either side. The minimum diameter of screw thread 30 is indicated at 80, the pitch diameter at 82 and the maximum diameter at 84. Conventionally, the three gaging wires 76 shown in FIG. 6 must be retained in abutment with screw thread 30 by hand or some support assembly while a micrometer 85 is positioned to obtain an "over wire" reading as discussed in the U.S. Pat. No. 4,821,422. In comparison, the present invention provides a method of determining the actual pitch diameter as well as the functional pitch diameter without the need for a user to attempt to retain three gaging wires in their proper positions while simultaneously manipulating the micrometer.

It is important that the maximum diameter of screw thread 30 not be larger than a predetermined size to assure threaded engagement between screw thread 30 and a threaded component part. If the threads 28 forming interior end surface 22 of housing 12 can engage screw thread 30, this means that the screw thread maximum diameter 84 is not excessive. In effect, the threaded surface 28 of ring gage housing 12 functions as a "GO" ring gage. The gaging plugs 40–46 do not interfere with the threaded engagement of housing 12 and screw thread 30 because helical springs 68 maintain the plug assemblies in their fully retracted positions out of contact with screw thread 30.

In order to determine the actual pitch diameter 82 of a typical screw thread 30, it is merely necessary to employ the ring gage housing 12 and the first pair of slidable gage plug assemblies 40 and 42, respectively, in conjunction with a conventional measuring device such as the micrometer 85 shown in FIG. 1. The first pair of oppositely disposed plugs 40 and 42 include flat interior end surfaces 56, confronting and spaced from one another on opposite sides of screw thread 30. Each interior end surface includes a single gaging wire 76 permanently affixed thereto by any conventional means such as cement or solder. Each gaging wire 76 extends in a direction generally perpendicular to the longitudinal axis X—X of housing 12.

To initiate the measuring process the screw thread 30 is threaded first into the central opening in housing 12 and micrometer 85 is then positioned adjacent the outer ends of plug assemblies 40 and 42. By manipulating the micrometer, the plug assemblies 40 and 42 move toward one another and screw thread 30 until the single gaging wire 76 attached to each inner end surface 56 comes to rest tangentially against adjacently disposed flank portions of screw thread 30. The micrometer reading, after subtracting a predetermined constant, provides the actual pitch diameter of screw thread 30. Because the gaging wires 76 are permanently attached to the plug assemblies, there is no chance of the wires becoming lost or damaged during the measuring process.

In order to determine the functional pitch diameter of screw thread 30, the second pair of gaging plug assemblies 44 and 46 are employed. As shown in FIGS. 2 and 7, each plug assembly includes a threaded inner end surface 90 having a generally sawtooth configuration. The particular sawtooth shape of the end surface 90 is identical to the shape of the external threads formed on screw thread 30, whereby the confronting inner end surfaces 90 in effect form a profile of screw thread 30.

The procedure for determining the functional pitch diameter is similar to the procedure for determining the actual pitch diameter. Screw thread 30 is inserted into housing 12 and micrometer 85 is positioned adjacent the outer end portions of gaging plug assemblies 44 and 46. The micrometer is manipulated to move the confronting inner end surfaces 90 into abutting contact with the external surface of screw thread 30. The micrometer reading, after subtraction of a predetermined constant, determines the functional pitch diameter of screw thread 30. Because it is nearly impossible to perfectly cut the threads forming screw thread 30, the functional pitch diameter will usually vary from the actual pitch diameter. By comparing the values for these two measurements, it is possible to determine whether the lead and flank angles of screw thread 30 are within acceptable limits.

While the sawtooth configuration is preferred for determining the functional pitch diameter, it is considered within the scope of the present invention to employ three or more gaging wires permanently attached to confronting inner end surfaces of a pair of oppositely disposed gage plug assemblies as shown in FIG. 8. The three gaging wires 92 are attached by cement, soldering or any well known method of attachment to the flat inner end surfaces 94. Whether the sawtooth inner surface of FIG. 7 is employed or the multiple gaging wires of FIG. 8, the present invention provides a unique device capable of easily determining the functional pitch diameter. Similarly, while the preferred embodiment of FIG. 4 employs a single gaging wire for the first pair of plug assemblies employed in determining the actual pitch diameter, it is considered within the scope of the present invention to employ conventional three gaging wires as shown in FIG. 6, with one plug assembly supporting a single wire and the opposing plug assembly supporting the remaining two gaging wires.

In order to determine the minor diameter 80 of screw thread, a third pair of identical gage plug assemblies 94 formed as shown in FIG. 9 are oppositely disposed from one another in housing 12. Either pair of gaging plug assemblies 40 and 42 or 44 and 46 may be removed and the plug assemblies 94 substituted therefore. Preferably, a further ring gage housing 12 identical to the housing 12 of FIG. 1 is employed. If multiple housings 12 are employed, they could be color coded to indicate the precise measurements provided by each housing. In either case, the inner end surface 98 of each plug assembly 94 is formed with a generally "V" or tooth shaped protrusion 100 extending outwardly therefrom. The two protrusions 100 extend toward one another when the plug assemblies 94 are positioned in their respective passageways. Preferably, the protrusions 100 have inclined side walls 101 and 102 each forming an included angle which is less than the included angle of screw thread 30. For example, if screw thread 30 is supposedly formed with an included angle of 60 degrees, then the included angle of each protrusion 100 can be approximately 55 degrees with a common axis T—T extending through the third pair plug assemblies as shown in FIG. 9. It is important that the angle of inclination of the of the side walls be less than the flank angles of screw thread 30 to assure that the end portion 103 of each protrusion 100 rests against the groove formed by screw thread 30. If a screw thread form having an included angle of 29 degrees is employed, it is necessary for the included angle of each protrusion 100 to be less than 29 degrees. After the plug assemblies 94 are manipulated by micrometer 85 to bring the protrusions 100 into contact with the groove of screw thread 30, the reading of the micrometer, after subtraction of a predetermined value representing the total length of the gaging plugs, will directly provide the minimum diameter of screw thread 30.

Another parameter of screw thread 30 which can be easily obtained by the present invention is concentricity of the pitch cylinder when compared to the outside diameter of the screw thread. The concentricity can be determined by employing a fourth pair of slidable gaging plug assemblies 104 and 106 as shown in FIG. 10. In particular, plug assembly 104 is formed with a smooth inner end surface 108, while plug assembly 106 includes an inner end surface 110 having a single gaging wire 112 fixedly attached thereto. Plug assemblies 104 and 106 are mounted in oppositely disposed passageways formed in a housing 12 in a manner similar to the previously described pairs of plug assemblies 40 and 42 or 44 and 46. The plug assemblies 104 and 106 are depressed by a micrometer to bring the smooth inner end surface 108 and the single gaging wire 112 into abutment with screw thread 30. Housing 12 and screw thread 30 are rotated relative to one another and the variations in the micrometer reading directly provide any change in concentricity.

As shown in FIG. 11, the major diameter of screw thread 30 is easily obtainable through the use of two plug assemblies 120 and 122, respectively. Each plug assembly is slidable within the housing and includes a smooth inner end surface 124 or 126, respectively. When plug assemblies 120 and 122 are depressed by a micrometer, not shown, the smooth end surfaces 124 and 126 come to rest tangentially against the outer edge of screw thread 30. The reading of the micrometer when corrected for the length of the plug assemblies provides the major diameter 84 of screw thread 30 as indicated in FIG. 6.

Whether two, three or even four separate measurements are obtained by the same hand held device is directly dependent on the intended use of the device. Preferably, at least two separate measurements are accomplished by a single housing 12 with two housings giving up to five major parameters including a "GO" ring check, the actual functional pitch diameter, the actual pitch diameter, the minor (or major) diameter, and the concentricity of the screw thread. The present invention provides a simplified system for measuring a variety of parameters of a screw thread with at least two different measurements being easily obtainable from a single hand held measuring device.

While the present invention has been disclosed in connection with the preferred embodiment thereof, it should be understood that there may be other embodiments which fall within the spirit and scope of the invention as defined by the following claims.

I claim:

1. A multi-purpose measuring device for use in determining various parameters of an externally threaded member, and comprising:
   a housing having a pair of side walls oppositely disposed from and extending substantially parallel to one another and ending in an outer surface of said housing;
   said housing including a cylindrical passageway extending between said opposite side walls, said cylindrical passageway having a continuously threaded surface with a maximum diameter no greater than the maximum diameter of an externally threaded member to be measured;

said housing further including at least one pair of openings, with each opening extending from said cylindrical passageway to said outer surface;

a separate gaging plug slidably disposed within each opening, each gaging plug having an inner end facing said cylindrical passageway and an outer end extending beyond the outer surface of said housing, and an elongated slot through each plug extending along the longitudinal axis of said plug at a distance from said inner end facing;

biasing means disposed for biasing each of said gaging plugs away from said cylindrical passageway;

stop means attached to said housing, extending through said elongated slot for retaining said biasing means; and gaging means supported by said gaging plugs for selectively engaging an externally threaded member following its insertion into said cylindrical passageway;

whereby specific parameters of said threaded member are determinable by manipulating a micrometer or the like to engage and slide said gaging plugs against the pressure of said biasing means until said gaging means enter the cylindrical passageway and engage said threaded member.

2. A measuring device according to claim 1, wherein the side walls, outer surface and cylindrical passageway of said housing define a substantially ring-shaped figure.

3. A measuring device according to claim 1, wherein said cylindrical passageway extends completely through the center of said housing along its longitudinal axis.

4. A measuring device according to claim 1, wherein said at least one pair of openings comprises two separate openings disposed on opposite sides of said cylindrical passageway, with said openings extending along a single transverse axis passing through said housing.

5. A measuring device according to claim 4, wherein each of said gaging plugs comprises a body having a bore extending from an outer end surface along the body's longitudinal axis to a position spaced from an inner end surface of the body, with each of said gaging plugs further including an end cap mounted on the outer end surface of the body.

6. A measuring device according to claim 5, wherein said stop means separate pairs of aligned pin holes, with a pair of pin holes extending from the opposite side walls to each of the transversely aligned openings, each pair of said pin holes being alignable with the elongated slot in one of sad gaging plugs, and a separate biasing pin extending through each pair of aligned pin holes and one of said gaging plugs positioned therebetween.

7. A measuring device according to claim 6, wherein said biasing means comprises a separate helical spring positioned in the bore of each gaging plug body, each spring being compressed between the gaging plug end cap and one of said biasing pins.

8. A measuring device according to claim 1, wherein said gaging means comprises a single gaging wire attached to the inner end of each gaging plug, with each gaging wire extending substantially perpendicular to the longitudinal axis of said housing, wherein said single gaging wires are selectively brought into contact with the threaded member following its insertion into the cylindrical passageway of said housing for determining the actual pitch diameter of said threaded member.

9. A measuring device according to claim 1, wherein said gaging means comprises the inner end of each gaging plug having a threaded configuration similar to the configuration of the threaded member to be measured, wherein said threaded end on each gaging plug is selectively brought into contact the threaded member following its insertion into the cylindrical passageway for determining the functional pitch diameter of the threaded member.

10. A measuring device according to claim 1, wherein said gaging means comprises a protrusion formed on the inner end of each gaging plug, with each protrusion including a pair of side walls inclined toward one another to form a substantially V-shaped configuration, wherein said V-shaped protrusions are selectively brought into contact with the surface extending between adjacent threads of the threaded member following its insertion into the cylindrical passageway for determining the minor diameter of the threaded member.

11. A measuring device according to claim 1, wherein said gaging means comprises one of said gaging plugs having a single gaging wire attached to an inner end, with said gaging wire extending in a direction substantially perpendicular to the longitudinal axis of said housing, and said remaining gaging plug having an inner end of smooth configuration, wherein said smooth inner end and said gaging wire are selectively brought into contact with the threaded member following its insertion into the cylindrical passageway for determining the concentricity of the threaded member.

12. A measuring device according to claim 1, wherein said housing includes two pairs of openings extending between said cylindrical passageway and said outer end surface, a first pair of openings disposed on opposite sides of said cylindrical passageway from one another and extending along a first transverse axis through said housing, with a second pair of openings also disposed on opposite sides of said cylindrical passageway from one another and extending along a second, different transverse axis thought said housing, wherein each of said four openings is spaced substantially ninety degrees from any adjacently disposed openings.

13. A measuring device according to claim 12, wherein a separate gaging plug is slidably disposed within each of the four openings forming said first and second pairs of openings, with said gaging plugs supporting gaging means for selectively engaging the externally threaded member following its insertion into the cylindrical passageway through said housing.

14. A measuring device according to claim 13, wherein said gaging plugs positioned within said first pair of oppositely disposed openings include confronting inner ends with first gaging means supported thereon, said first gaging means comprising a single gaging wire attached to each confronting inner end, with each gaging wire extending substantially perpendicular to the longitudinal axis through said housing, and said gaging plugs disposed within said second pair of oppositely disposed openings include confronting inner ends with second gaging means supported thereon, said second gaging means comprising a threaded end surface formed on each confronting inner end, whereby selective engagement of said first set of gaging plugs with a micrometer provides for a determination of the actual pitch diameter of the threaded member following its insertion into the cylindrical passageway, and selective engagement of said second set of gaging plugs with the micrometer provides a determination of the functional pitch diameter of the threaded member.

15. A measuring device according to claim 13, wherein said gaging plugs positioned within said first pair of oppositely disposed openings include confronting inner ends with first gaging means supported thereon, said first gaging means comprising a substantially V-shaped protrusion extending from each confronting inner end, and said gaging plugs disposed within said second pair of oppositely disposed openings include confronting inner ends with second gaging means supported thereon, said second gaging means comprising a smooth end surface formed on one said gaging plugs and a single gaging wire attached to the inner end of remaining gaging plug, whereby selective engagement of said first set of gaging plugs with a micrometer provides for a determination of the minor diameter of the threaded member following its insertion into the cylindrical passageway, and selective engagement of said second set of gaging plugs with the micrometer provides for a determination of the concentricity of the threaded member.

* * * * *